(12) United States Patent
Douglas et al.

(10) Patent No.: US 10,031,158 B1
(45) Date of Patent: Jul. 24, 2018

(54) OPTOMECHANICAL FORCE SENSORS, CANTILEVERS, AND SYSTEMS THEREOF

(71) Applicant: Sandia Corporation, Albuquerque, NM (US)

(72) Inventors: Erica Ann Douglas, Albuquerque, NM (US); Matt Eichenfield, Albuquerque, NM (US); Adam Jones, Albuquerque, NM (US); Ryan Camacho, Albuquerque, NM (US); Michael David Henry, Albuquerque, NM (US); James Kenneth Douglas, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 23 days.

(21) Appl. No.: 15/378,900

(22) Filed: Dec. 14, 2016

Related U.S. Application Data

(60) Provisional application No. 62/267,972, filed on Dec. 16, 2015.

(51) Int. Cl.
*G01Q 60/38* (2010.01)

(52) U.S. Cl.
CPC .................. *G01Q 60/38* (2013.01)

(58) Field of Classification Search
CPC ........ G01Q 10/00; G01Q 10/02; G01Q 10/04; G01Q 10/06; G01Q 10/065; G01Q 20/00; G01Q 20/02; G01Q 60/18; G01Q 60/20; G01Q 60/22; G01Q 70/00; G01Q 70/06; G01Q 70/08

USPC ........... 850/1, 2, 3, 4, 30, 31, 62, 52, 55, 56
See application file for complete search history.

(56) References Cited

U.S. PATENT DOCUMENTS

| | | |
|---|---|---|
| 5,493,577 A | 2/1996 | Choquette et al. |
| 5,568,499 A | 10/1996 | Lear et al. |
| 7,066,004 B1 | 6/2006 | Kohler et al. |
| 7,106,448 B1 | 9/2006 | Vawter et al. |
| 7,148,436 B1 | 12/2006 | Lee et al. |
| 7,212,944 B1 | 5/2007 | Kohler et al. |
| 7,275,433 B2 | 10/2007 | Caminada et al. |
| 7,355,720 B1 | 4/2008 | Carr et al. |
| 8,087,295 B2 | 1/2012 | Netzer et al. |
| 8,205,497 B1 | 6/2012 | Okandan et al. |
| 8,228,964 B2 | 7/2012 | Sekiguchi et al. |

(Continued)

FOREIGN PATENT DOCUMENTS

WO    WO201313067 A1    9/2013

OTHER PUBLICATIONS

An. S. et al., "Optomechanical transducer-based nanocantilever for atomic force microscopy," 2015 International Conference on Optical MEMS and Nanophotonics (OMN), held on Aug. 2-5, 2015 in Jerusalem, Israel (pp. 1-2).

(Continued)

*Primary Examiner* — Nicole Ippolito
(74) *Attorney, Agent, or Firm* — Martin I. Finston

(57) ABSTRACT

An optomechanical force sensor includes a substrate, a cantilevered beam anchored to the substrate, and a probe tip positioned near an end of the cantilevered beam distal to the substrate. A suspended waveguide is disposed on the cantilevered beam and is optically continuous with an input/output waveguiding structure. An optical cavity is defined within the suspended waveguide.

7 Claims, 5 Drawing Sheets

(56) References Cited

U.S. PATENT DOCUMENTS

| | | | |
|---|---|---|---|
| 8,459,110 | B2 | 6/2013 | Cazzaniga et al. |
| 8,680,810 | B1 | 3/2014 | Okandan et al. |
| 8,726,730 | B1 | 5/2014 | Nielson et al. |
| 8,783,106 | B1 | 7/2014 | Neilson et al. |
| 8,997,258 | B2 | 3/2015 | Aksyuk et al. |
| 9,482,691 | B1 * | 11/2016 | Ukhanov ............... G01Q 20/04 |
| 2013/0121633 | A1 | 5/2013 | Painter et al. |

OTHER PUBLICATIONS

Augustin, M. et al. "Dispersion properties of photonic crystal waveguides with a low in-plane index contrast," New J. Phys. 2006, 8:210.

Blasius, T. et al. "Chip-scale cavity-optomechanical accelerometer," Conf. on Lasers and Electro-Optics (CLEO): Science and Innovation, held on Jun. 9-14, 2013 in San Jose, CA, abstract CW3F.1 (2 pp.).

Chow, E. et al. "Three-dimensional control of light in a two-dimensional photonic crystal slab," Nature 2000, 407:983-6.

Chow, E. et al. "Demonstration of high waveguide bending efficiency (90%) in a photonic-crystal slab at 1.5 μm wavelengths," Proc. SPIE 2001, 4283:453-6.

Davanco, M. et al. "Slot-mode-coupled optomechanical crystals," Opt. Express 2012, 20(22)24394-410.

Doolin, C. et al. "Multidimensional optomechanical cantilevers for high-frequency force sensing," New J. Phys. 2014, 16:Art. 035001 (13 pp.).

Eichenfield, M. et al. "Cavity optomechanics in photonic and phononic crystals: engineering the interaction of light and sound at the nanoscale," Doctoral Dissertation, California Institute of Technology, 2010 (182 pp.).

Eichenfield, M. et al. "A picogram- and nanometre-scale photonic-crystal optomechanical cavity," Nature, May 2009, 459:550-5.

Gavartin, E. et al. "A hybrid on-chip optomechanical transducer for ultrasensitive force measurements," Nat. Nanotechnol. 2012, 7:509-14.

Hu, Y.W. et al. "Optomechanical sensing with on-chip microcavities," Front. Phys. 2013, 8(5):475-90.

Jones, A.M. et al., "Ultra-low crosstalk, CMOS compatible waveguide crossings for densely integrated photonic interconnection networks," Opt. Express 2013, 21(10), 12002-13.

Krause, A.G. et al., "A high-resolution microchip optomechanical accelerometer," Nat. Photon. 2012;6:768-72.

Liu, Y. et al. "Integrated cavity optomechanical sensors for atomic force microscopy," Microsystems for Measurement and Instrumentation (MAMNA), held on Mar. 27-27, 2012 in Annapolis, MD (pp. 1-3).

Liu, Y. et al. "Wide cantilever stiffness range cavity optomechanical sensors for atomic force microscopy," Opt. Express 2012, 20(16):18268-80.

Liu, Y. et al."Electromagnetically induced transparency and wideband wavelength conversion in silicon nitride microdisk optomechanical resonators," Phys. Rev. Lett. 2013, 110:Art. 223603 (5 pp.).

Miao, H. et al. "Cavity optomechanical sensors." 16th International Solid-State Sensors, Actuators and Microsystems Conference (Transducers), held on Jun. 5-9, 2011 in Beijing, China (pp. 1535-1538).

Serkland, D.K. et al., "VCSELs for atomic sensors," Proc. SPIE 2007, 6484:648406 (10 pp.).

Serkland, D.K. et al., "VCSELs for atomic sensors," Proc. SPIE Feb. 2006, 6132:613208 (11 pp.).

Srinivasan, K. et al., Cavity optomechanical sensors for atomic force microscopy, CLEO:2011—Laser Applications to Photonic Applications, held on May 1-6, 2011in Baltimore, MD, paper CThJ2 (2 pp.).

Srinivasan, K. et al., "Optomechanical transduction of an integrated silicon cantilever probe using a microdisk resonator," Nano Lett. 2011, 11:791-7.

Zhang, R. et al., "High mechanical fMQM product tuning fork cavity optomechanical transducers," Integrated Photonics Research, Silicon and Nanophotonics: Advanced Photonics, held on Jun. 27-Jul. 1, 2015 in Boston, MA, paper IT4B.5 (3 pp.).

Zou, J. et al., "Integrated silicon optomechanical transducers and their application in atomic force microscopy," CLEO:2014—Optomechanics II, held on Jun. 8-13, 2014 in San Jose, CA, paper SF2M.7 (2 pp.).

* cited by examiner

OPTOMECHANICAL FORCE SENSORS, CANTILEVERS, AND SYSTEMS THEREOF

CROSS-REFERENCE TO RELATED APPLICATION

This application claims priority to U.S. Provisional Patent Application No. 62/267,972, filed on Dec. 16, 2015 under the title, "OPTOMECHANICAL FORCE SENSORS, CANTILEVERS, AND SYSTEMS THEREOF," the entirety of which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to optomechanical force sensors including a suspended waveguide. In some instances, such sensors can be configured to optically detect a change in force exerted on a probe tip (e.g., arising from a change in surface topography of a sample). Systems including such sensors are also described herein.

BACKGROUND OF THE INVENTION

As nanoscale fabrication and research progress, it becomes increasingly necessary to probe the forces exerted by various kinds of surfaces (e.g. surfaces of solids and of biological samples) at the atomic level. One of the workhorses for measuring a force exerted by surface topography is the atomic force microscope (AFM). Drawbacks experienced with the current generation of AFMs include limited optical sensitivity to mechanical deflection and limited dynamic range. Accordingly, there is a need for new kinds of force sensors capable of more sensitive detection at the nano-scale and at the atomic scale.

SUMMARY OF THE INVENTION

The present invention relates to an optomechanical device that provides a suspended photonic cavity and a probe tip in proximity to the cavity. The device can also include one or more optical waveguides to direct optical signals to and from the photonic cavity. Upon varying a force applied to the probe tip, the photonic cavity is mechanically perturbed, producing in turn an optically detectable change in the resonant frequency of the photonic cavity. Even slight perturbations or deformations in the optical cavity can lead to large shifts of the resonant frequency of the system. Thus force measurements can be correlated to optical signals.

In one embodiment of the invention, the force sensor is an optical topographic probe including an optomechanically coupled system. In a particular non-limiting embodiment, the system includes a high-Q optical cavity within a cantilevered beam suspended from a substrate such as a microchip. In examples, the cantilevered beam includes a single-mode optical waveguide. The cantilevered beam may assume any of various shapes, including in particular a rectangular shape and a half-loop such as a U-shape or Π-shape.

Although no particular mechanism is to be viewed as limiting, we note that the disclosed system can allow for increased optical readout sensitivity of mechanical forces experienced by a probe when the probe is of a sub-wavelength dimensional scale.

That is, it is well known for the probes of scanning force microscopes to be mounted on cantilever beams. Sensitivity is enhanced by decreasing the mass of the cantilever probe. However, the mass cannot be decreased indefinitely. Instead, a lower bound on the mass is imposed because a laser beam (used to read the position of the probe) cannot be focused to a point, but only at best to a diffraction-limited spot. Hence once the probe drops to below the size of the diffraction-limited spot, only a fraction of the incident laser light will be intercepted and reflected toward a detector. Consequently, as mechanical sensitivity increases, optical sensitivity will decrease, and a limiting tradeoff will eventually be reached.

Moreover, to meet the typically very stringent requirement on displacement sensitivity, AFMs must generally employ a very compliant cantilever. However, the compliance is inversely proportional to the dynamic range of the system, i.e. to the range of displacements over which the optical response to mechanical deflection is linear. Hence there is a built-in limit on the achievable dynamic range. Simply stiffening the cantilevers in conventional AFMs would not solve this problem, because it would degrade the displacement sensitivity.

Implementations of our new optical topographic probe incorporate an optomechanically coupled system comprising a cantilevered, high-Q optical cavity suspended from a microchip. A single-mode optical waveguide can direct the light within and into and out of the optical cavity. This combination of features permits the use of a sub-wavelength probe without the penalty suffered by reflective probes in conventional ATMs. Concurrently, this combination of features can enhance the sensitivity to mechanical deflection enough to permit the stiffening of the cantilever to achieve enhanced dynamic range.

Still further, the high-Q optical cavity in our system can be probed, in implementations, using on-chip optical waveguides. This allows the system to be wavelength multiplexed, so that a plurality of waveguide-fed cavities all use slightly different wavelengths of light. This, in turn, allows for a multiplexer/demultiplexer (MUX/DEMUX) architecture using wavelength-division multiplexing (WDM) or dense wavelength-division multiplexing (DWDM) that can massively parallelize the topographic measurement of a system under test. Among other advantages, this can reduce the time required to measure large areas.

Definitions

As used herein, the term "about" means+/−10% of any recited value. As used herein, this term modifies any recited value, range of values, or endpoints of one or more ranges.

By "micro" is meant having at least one dimension that is less than 1 mm. For instance, a microstructure (e.g., any structure described herein) can have a length, width, height, cross-sectional dimension, circumference, radius (e.g., external or internal radius), or diameter that is less than 1 mm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates to optomechanical devices, including sensors and systems thereof. As described herein, an exemplary optomechanical device is configured to measure a force exerted on a probe tip, which in turn is in proximity to a suspended optical waveguide. The suspended waveguide includes a plurality of holes in a periodic or semiperiodic one-dimensional or two-dimensional array, and it also has a resonant optical frequency that is dependent on the periodicity of the holes.

When a force is exerted on the probe tip, the probe tip is deflected, which in turn changes one or more dimensions of the holes that perforate the waveguide. This dimensional change results in a change in an optical property of the waveguide, such as its optical resonant frequency. The resonant frequency can be measured according to any of various known techniques. For example, optical transmission can be measured as a function of detuning from the initial resonant frequency.

Any of various forces and conditions of interest can be measured. Forces that we believe can be measured using our system include, for example, those due to variations in electron density, surface corrugation, surface stiffness, electrical conductivity, magnetization, topography, atomic arrangement, chemical bonding, and surface defects, as well as mechanical contact forces, van der Waals forces, capillary forces, electrostatic forces, Casimir force, solvation forces, and combinations thereof.

Figure 1A:
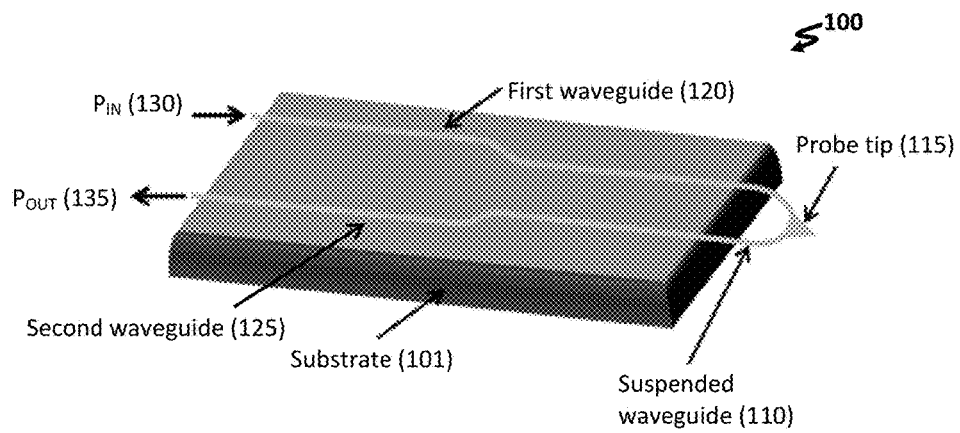
FIGS. 1A-1B show schematics of an exemplary optomechanical device useful for any sensor described herein. Provided are (A) a schematic of an optomechanical device 100 including a suspended waveguide 110 and a probe tip 115; and (B) a schematic of an integrated waveguide structure having a photonic cavity 113 and a probe tip 115.

FIG. 1A provides an exemplary optomechanical sensing device 100. As seen in the figure, a cantilevered beam 110 projects from an end of a substrate 101. The cantilevered beam shown in the figure is constituted as a suspended waveguide. A probe tip 115 is disposed on the suspended waveguide 110.

Although the cantilevered beam 110 is shown in the figure as having a U-shaped conformation, this should be understood as exemplary only and as non-limiting. The beam can assume any of various shapes, provided that there is a path for incoming and for outgoing guided light. Thus beam 110 may in alternative embodiments be triangular or even Π-shaped, among other conformations. As will be seen below, beam 110 can alternatively be rectangular in shape, and it can even have a common path for both the incoming and the outgoing light.

Depending on the precise fabrication technique that is used, the cantilevered beam may, e.g., be an extension of a waveguide structure formed on the top of substrate 101 so that it projects from an edge of the substrate, or it may be an extension of a waveguide structure that is buried within the substrate, so that it projects from an end face of the substrate.

Figure 1B:
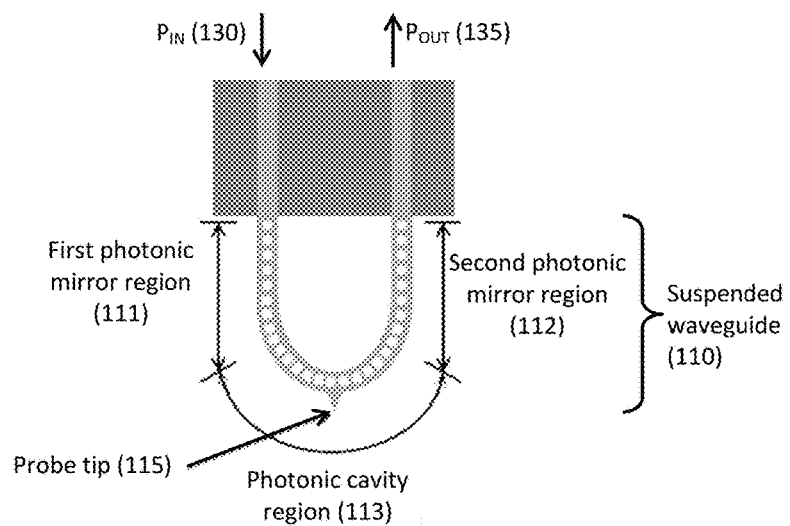

Turning back to the figures, it will be seen in FIG. 1B that the suspended waveguide 110 includes several regions, including a first photonic mirror region 111, a photonic cavity region 113, and a second photonic mirror region 112. Also seen in the figure is the probe tip 115.

Optical signals are provided to and delivered from the suspended waveguide 110 by use of waveguides 120,125. As can be seen, a first waveguide 120 provides an optical signal delivering a power input $P_{IN}$ 130 to a first end of the suspended waveguide 110, and a second waveguide 125 receives an optical signal from a second end of the suspended waveguide 110 having a power output $P_{OUT}$ 135.

The geometrical design parameters of the above-enumerated regions 111, 112, and 113 include length, width (referred to below by the symbol "w"), height, hole width $h_y$, hole height $h_x$, and local period $\Lambda_{nh}$. (See, e.g., FIG. 2A-2C). The index "nh" refers to the sequential position of the hole.

Figure 2A:
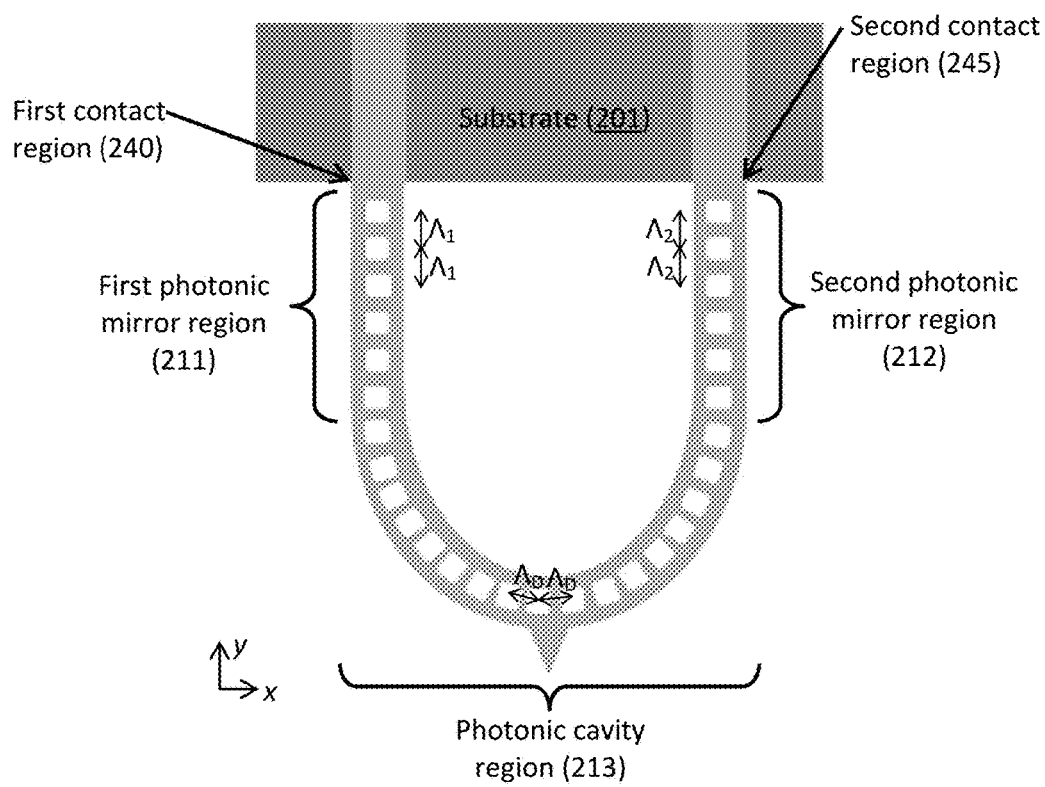
FIGS. 2A-2C show schematics of different regions of an exemplary optomechanical device. Provided are (A) a schematic of an exemplary photonic cavity region 213 and mirror regions 211,212; (B) a schematic of holes in the waveguide; and (C) a graph showing the change in periodicity A between the holes in the mirror regions and holes in the defect region, i.e., the photonic cavity region. The graph in FIG. 2C is from M. Eichenfield et al., "Cavity optomechanics in photonic and phononic crystals: engineering the interaction of light and sound at the nanoscale," *Doctoral Dissertation*, California Institute of Technology, 2010 (182 pp.), hereinafter "Eichenfield Thesis", the entirety of which is incorporated herein by reference.

As seen in FIG. 2A, an exemplary suspended waveguide structure includes a first anchor region 240 where the waveguide projects from, e.g., an edge of substrate 201; a first photonic mirror region 211 in which the holes (in a curvilinear array in this example) have a period $\Lambda_1$; a probe tip; a second photonic mirror region 212 having a period $\Lambda_2$; a photonic cavity region 213 having a period $\Lambda_D$ in proximity to the probe tip, a period $\Lambda_1$ in proximity to the first mirror region, and a period $\Lambda_2$ in proximity to the second mirror region; and a second anchor region 245 where the waveguide projects from (in this example) the edge of substrate 201.

In example embodiments, the suspended waveguide is formed as an air-clad core, although alternative embodiments in which the core is contained between cladding layers are not excluded. Suitable waveguide dimensions are readily determined according to conventional teachings. In one instance, the suspended waveguide has a length that is about 10 µm to about 500 µm, as well as sub-micron cross-sectional dimensions, for example dimensions in the range 200-300 nm.

The holes in the suspended waveguide are precisely etched and positioned to define the photonic cavity 213. In the embodiment illustrated in FIG. 2A, for example, the photonic cavity is defined between the mirror regions 211 and 212, which are likewise defined by the pattern of holes. The photonic cavity is designed to have an optical resonant frequency, which may take any value within a broad range. One example is a frequency of approximately 400 THz, corresponding to a vacuum wavelength of about 780 nm. The optical cavity preferably has a relatively high quality factor Q, for example a Q greater than 100. In particular examples, Q lies in the range 104-106.

Figure 2B:
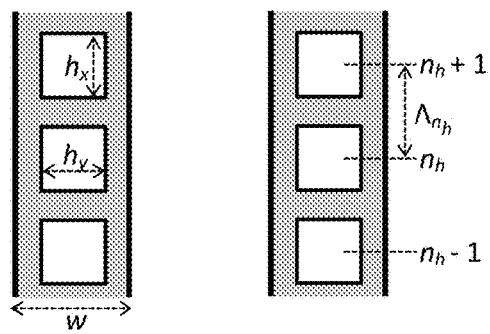
Figure 2C:
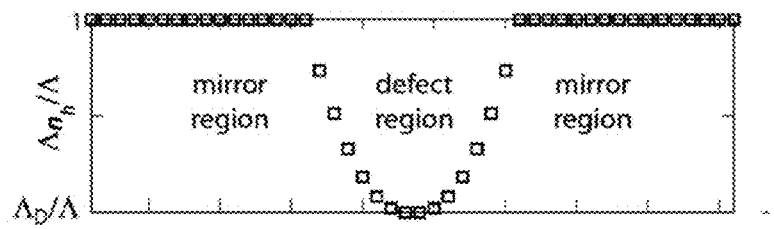

In the example of FIG. 2C, it is seen that the period of the hole array is constant in the mirror regions, but within the photonic cavity region (labeled "defect region" in the figure), a change in the hole period varies parabolically, with mirror symmetry between the first and second mirror regions. As indicated in the figure, the hole period in the mirror regions has the value $\Lambda$. At the center of the cavity, the period decreases to a value $\Lambda_D$.

An example photonic cavity region is based on the optomechanical cavities described in:

M. Eichenfield et al., "A picogram- and nanometer-scale photonic-crystal optomechanical cavity," *Nature* 2009 May, 459:550-5;

T. Blasius et al., "Chip-scale cavity-optomechanical accelerometer," *Conf. on Lasers and Electro-Optics (CLEO): Science and Innovation*, held on 9-14 Jun. 2013 in San Jose, Calif., abstract CW3F.1 (2 pp.);

M. Davanço et al., "Slot-mode-coupled optomechanical crystals," *Opt. Express* 2012, 20(22):24394-410; and Krause A G et al., "A high-resolution microchip optomechanical accelerometer," *Nat. Photon.* 2012; 6:768-72, each of which is incorporated herein by reference in its entirety.

Other references useful in this regard are the published patent applications U.S. Pub. No. 2013/0121633 and Int. Pub. No. WO 2013/131067, each of which is incorporated herein by reference in its entirety.

Any combination of the optical components, including the suspended waveguides and the first and second waveguides that feed them, can be integrated onto a photonic circuit. In examples, such a photonic circuit is laid out in a single photonic circuit layer. The photonic circuit can be fabricated in any suitable photonic material or combination of such materials.

The photonic circuit can include waveguiding structures and resonant grating couplers. Without limitation, structures that may be useful in this regard include periodic arrays of holes, beams, gratings, and lattices.

Exemplary materials for waveguides and other photonic structures include silicon, silicon nitride, gallium arsenide, aluminum gallium arsenide, aluminum oxide, silicon oxide, niobium oxide (e.g., niobium pentoxide), other III-V materials (including binary, ternary, and quaternary alloys), as well as layers, stacks, or combinations of any of these.

Further examples of photonic structures and materials are provided in Eichenfield Thesis, cited above. Still further examples are provided in:

E. Chow et al., "Three-dimensional control of light in a two-dimensional photonic crystal slab," *Nature* 2000, 407: 983-6;

E. Chow et al., "Demonstration of high waveguide bending efficiency (>90%) in a photonic-crystal slab at 1.5 μm wavelengths," *Proc. SPIE* 2001, 4283:453-61;

A. M. Jones et al., "Ultra-low crosstalk, CMOS compatible waveguide crossings for densely integrated photonic interconnection networks," *Opt. Express* 2013, 21(10), 12002-13;

M. Augustin et al., "Dispersion properties of photonic crystal waveguides with a low in-plane index contrast," *New J. Phys.* 2006, 8:210;

S. An et al., "Optomechanical transducer-based nanocantilever for atomic force microscopy," 2015 *International Conference on Optical MEMS and Nanophotonics (OMN)*, held on 2-5 Aug. 2015 in Jerusalem, Israel (pp. 1-2);

C. Doolin et al., "Multidimensional optomechanical cantilevers for high-frequency force sensing," *New J. Phys.* 2014, 16:Art. 035001 (13 pp.);

E. Gavartin et al., "A hybrid on-chip optomechanical transducer for ultrasensitive force measurements," *Nat. Nanotechnol.* 2012, 7:509-14;

Y. W. Hu et al., "Optomechanical sensing with on-chip microcavities," *Front. Phys.* 2013, 8(5):475-90;

Y. Liu et al., "Integrated cavity optomechanical sensors for atomic force microscopy," *Microsystems for Measurement and Instrumentation (MAMNA)*, held on 27-27 Mar. 2012 in Annapolis, Md. (pp. 1-3);

Y. Liu et al., "Wide cantilever stiffness range cavity optomechanical sensors for atomic force microscopy," *Opt. Express* 2012, 20(16):18268-80;

Y. Liu et al., "Electromagnetically induced transparency and wideband wavelength conversion in silicon nitride microdisk optomechanical resonators," *Phys. Rev. Lett.* 2013, 110:Art. 223603 (5 pp.);

H. Miao et al., "Cavity optomechanical sensors." *16th International Solid-State Sensors, Actuators and Microsystems Conference (TRANSDUCERS)*, held on 5-9 Jun. 2011 in Beijing, China (pp. 1535-8);

U.S. Pat. No. 8,997,258;

K. Srinivasan et al., "Cavity optomechanical sensors for atomic force microscopy," *CLEO:2011—Laser Applications to Photonic Applications*, held on 1-6 May 2011 in Baltimore, Md., paper CThJ2 (2 pp.);

K. Srinivasan et al., "Optomechanical transduction of an integrated silicon cantilever probe using a microdisk resonator," *Nano Lett.* 2011, 11:791-7;

R. Zhang et al., "High mechanical $f_M Q_M$ product tuning fork cavity optomechanical transducers," *Integrated Photonics Research, Silicon and Nanophotonics: Advanced Photonics*, held on 27 Jun.-1 Jul. 2015 in Boston, Mass., paper IT4B.5 (3 pp.); and J. Zou et al., "Integrated silicon optomechanical transducers and their application in atomic force microscopy," *CLEO:2014—Optomechanics II*, held on 8-13 Jun. 2014 in San Jose, Calif., paper SF2M.7 (2 pp.), each of which is incorporated herein by reference in its entirety.

The optomechanical device can be formed in any suitable manner. In one instance, the device is manufactured on a silicon-on-insulator (SOI) substrate having a silicon handle substrate, a buried oxide spacer layer, a single crystal silicon device layer, and a silicon nitride hard stop layer. For at least some embodiments, the use of a SOI wafer can be advantageous by allowing for the separation of large and fine features that are to be defined in the optomechanical device.

Exemplary methods for making and testing MEMS-based and photonic-based sensors that may be useful in this regard are described in U.S. Pat. Nos. 7,066,004, 7,106,448, 7,148, 436, 7,212,944, 7,275,433, 7,355,720, 8,087,295, 8,205,497, 8,459,110, 8,680,810, 8,726,730, and 8,783,106, as well as in the published patent application U.S. Pub. No. 2013/0121633, each of which is incorporated herein by reference in its entirety.

Also within the scope of the present invention are systems in which one or more optomechanical sensor devices as described above are combined with one or more optical sources to deliver an optical signal to the device and one or more photodetectors to receive an optical signal from the device. In one instance, the system includes an integrated structure having such device(s), optical source(s), and photodetector(s).

In another instance, a different optical wavelength is provided to the optical input of each of a plurality of optomechanical sensor devices in a wavelength-multiplexed system that can discriminate a plurality of concurrent signals.

In yet another instance, each of a plurality of optomechanical sensor devices has a different optical resonant frequency as determined, for example, by the respective hole period in its suspended waveguide.

Figure 3A:
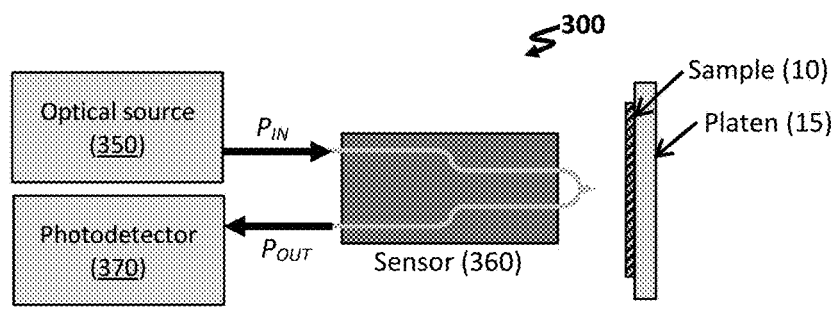
FIGS. 3A-3E show schematics of exemplary systems and structures including an optomechanical structure described herein. Provided are (A) a schematic of an exemplary system 300 including an optomechanical device 360, an optical source 350, and a photodetector 370; (B) a schematic showing the operation of an exemplary force sensor including a suspended waveguide 310; (C) a schematic showing an exemplary cantilever structure 3100; (D) a schematic showing an exemplary system 3000 including a cantilever structure 3100 and a handling support 3200; and (E) a schematic showing another exemplary system 3500 including a cantilever structure 3600 and a handling support 3700 having a photonic circuit layer 3602 that extends between a bottom surface of a handling support 3700 and a top surface of the substrate 3601.

FIG. 3A provides an exemplary system 300 including an optomechanical sensor device 360, an optical source 350, and a photodetector 370. The optical source provides an optical input signal having power $P_{IN}$ to the device, and the photodetector receives an optical output signal having power $P_{OUT}$ from the device. In addition, the device has a probe tip that can be configured to be in proximity to a sample 10 disposed on a platen 15. The device and/or the platen can be configured to move, thereby providing a rastered scan of the sample's surface.

Figure 3B:
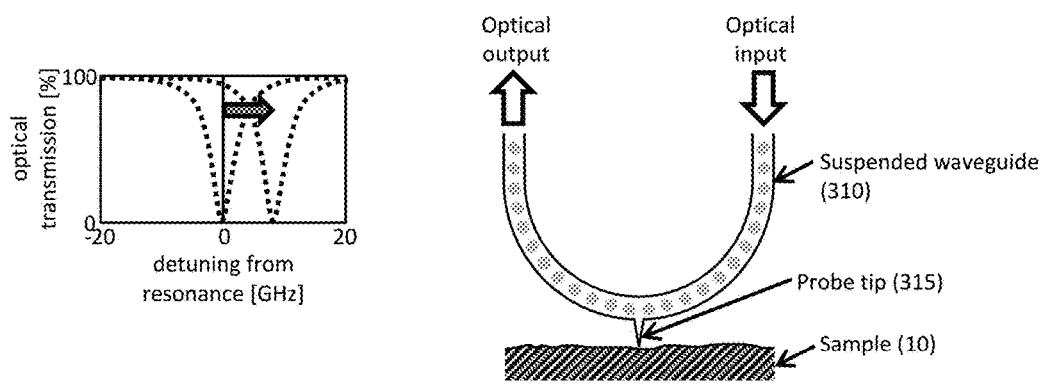

As illustrated in FIG. 3B, measurements of optical transmission through the waveguide can be used to measure changes in the resonant frequency of the optical cavity, either by direct measurement of attenuation at a fixed wavelength, or by monitoring the transmission as a function of the amount of detuning during a wavelength scan. The changes in optical transmission (or the measurements of detuning) can be correlated to the amount of force exerted on the probe tip 315 by the sample 10.

The system can include any useful optical or optoelectronic component. Exemplary components include one or more of the following: a polarization controller (e.g., between the optical source and the device), a variable optical attenuator (e.g., between the optical source and the device), a high pass filter, a low pass filter, an amplifier, a coupler, a splitter, a network analyzer, an avalanche photodiode, an electro-optic modulator, a camera, a platen, a piezoelectric motor, an alignment laser, a multiplexer, a demultiplexer, a pulse generator, a specialty semiconductor laser, an integrated VCSEL-RCPD circuit (vertical-cavity surface-emitting lasers, resonant-cavity photodiodes), a photonic integrated circuit (e.g., GaAs- and/or InP-based circuits), an optical amplifier, an optical modulator, a photodetector, an optical switch, a planar lightwave circuit (e.g., SiON materials set) such as various optical guided-wave filters and switches, an optical data link, a micromirror array, a subsystem for switch matrices and adaptive optics, radio-frequency switches, an optical network that includes one or more phase shifters and tunable filters, a power amplifier, a low-noise amplifier, a rad-hard heterojunction bipolar transistor, and/or a high-electron mobility transistor.

The optomechanical device can be employed with one or more optical sources and photodetectors. Advantageous for use in this context are ultra-low threshold, ultra-low noise optical sources and photodetectors such as the vertical cavity surface emitting lasers (VCSELs), light emitting diodes (LEDs), and silicon photodetectors for chip-scale atomic spectroscopy described in:

D. K. Serkland et al., "VCSELs for atomic sensors," *Proc. SPIE* 2007, 6484:648406 (10 pp.) and D. K. Serkland et al., *Proc. SPIE* 2006 February, 6132:613208 (11 pp.), each of which is incorporated herein by reference in its entirety.

In example embodiments, the optical source is one or more vertically emitting chip-scale laser sources that emit at the resonant frequency of the optical cavity, plus or minus half the optical resonant linewidth.

In example embodiments, the laser source is rigidly bonded to a substrate or to a photonic circuit. An exemplary optical source is a vertical-cavity surface-emitting laser (VCSEL) having a pair of reflectors disposed around a gain element (e.g., a quantum-well active region that includes one or more quantum-well layers (e.g., including gallium arsenide and/or indium gallium arsenide nitride)). Other VCSEL structures (e.g., single frequency VCSELs) and methods of their fabrication are described in U.S. Pat. Nos. 5,493,577, 5,568,499, and 8,228,964, each of which is incorporated herein by reference in its entirety.

Low-noise silicon optical detectors are also desirable. Examples are provided by the detectors used in chip-scale atomic spectroscopy. Such detectors have voltage and current noise levels that can permit shot-noise-limited operation at power levels typical of the VCSELs.

In an example embodiment, the photodetector is a vertically integrated photodetector. An optical signal is transmitted from the suspended waveguide, routed by the photonic circuit, and directed to the photodetector where it is absorbed, thereby producing a photocurrent proportional to the amount of light transmitted past the suspended waveguide. If an applied force causes displacement of a probe tip disposed on the suspended waveguide, then changing a hole dimension in the suspended waveguide can result in a change in resonant frequency. This in turn causes the amount of transmitted light to change, which in turn changes the detector photocurrent.

Figure 3C:
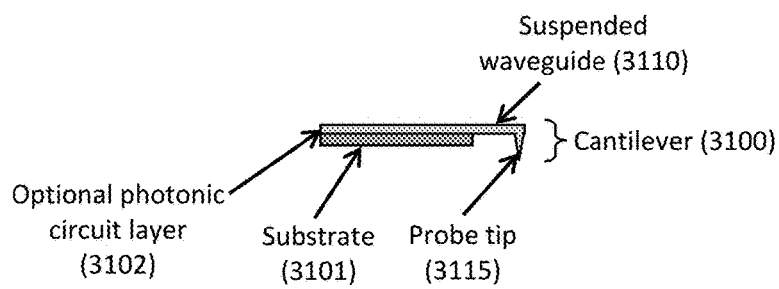

As explained above, the optomechanical sensor device includes a cantilever structure including a suspended waveguide. As seen in FIG. 3C, an exemplary cantilever structure 3100 includes a substrate 3101, a suspended waveguide 3110, and a probe tip 3115. Optionally, the cantilever structure further includes a plurality of waveguides disposed on the substrate, such as a first waveguide configured to deliver an optical input signal to a first end (e.g., a first anchor region) of the suspended waveguide and a second waveguide configured to receive an optical output signal from a second end (e.g., a second anchor region) of the suspended waveguide.

In some embodiments, the suspended waveguide is configured to receive the optical input signal, detect a force exerted on the probe tip, and emit the optical output signal in response to the force. In one instance, the suspended waveguide 3110 and the probe tip 3115 are provided on a single photonic circuit layer 3102, which in turn is disposed on a top surface of the substrate 3101.

The cantilever structure can be configured to include a support that facilitates handling. The support can be configured to reversibly attach and detach from a mount, which in turn is attached to further system components such as measurement and signal-processing components. This facilitates removal and replacement of the cantilever structure and its associated support after use, which is advantageous because probe tips can be degraded by use and even broken upon contact with a sample.

Figure 3D:
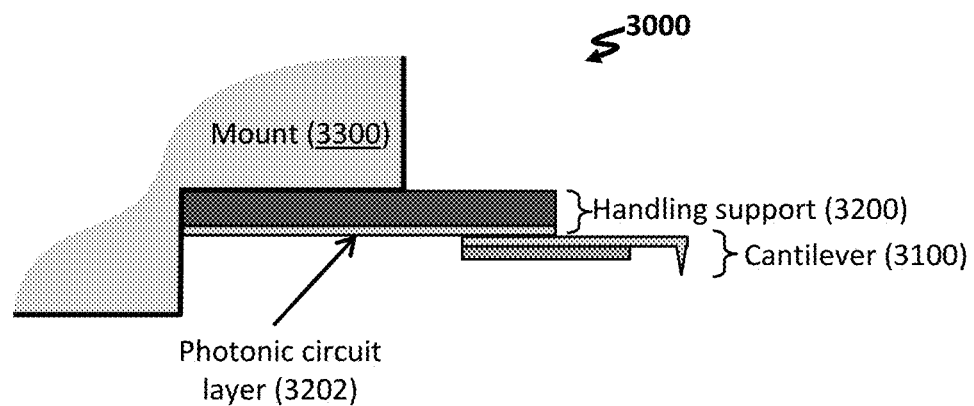
Figure 3E:
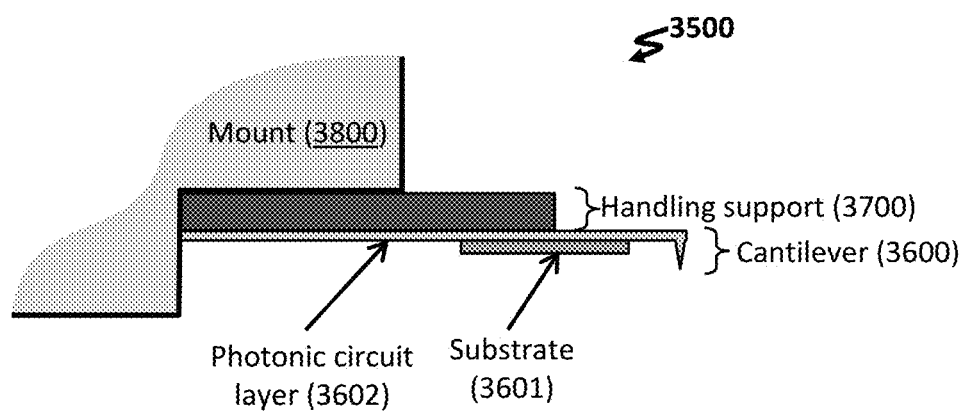

FIG. 3D and FIG. 3E provide exemplary cantilever structures disposed on a support. FIG. 3D provides an exemplary assembly 3000 including a cantilever structure 3100 and a handling support 3200 configured to attach to the cantilever structure. The handling support can be configured to route optical signals on to and off of the cantilever structure, as well as to reversibly attach to a mount 3300 of a force sensor. In one instance, the handling support includes a photonic circuit layer 3202 disposed on a bottom surface of the handling support 3200, in which the bottom surface of the photonic circuit layer 3202 is configured to attach to a top surface of the cantilever structure 3100.

It will be seen that in the example of FIG. 3D, there are cantilevered beams at least at two levels. First, the suspended waveguide is cantilevered because it projects from an end of the substrate. Second, a portion of the cantilever structure including the suspended waveguide and the substrate is anchored by and projects from an end of the handling support. A similar composite series of cantilevered beams is seen in the example of FIG. 3E, described below.

FIG. 3E provides another exemplary assembly 3500 including a cantilever structure 3600 and a handling support 3700 configured to attach to the cantilever structure. As can be seen, the photonic circuit layer 3602 is a single layer that extends between a bottom surface of the handling support 3700 and a top surface of the substrate 3601. The handling support 3700 can be configured to route optical signals on to and off of the cantilever structure 3600, as well as to reversibly attach to a mount 3800 of a force sensor.

Example 1

A single-mode waveguide is defined on the device layer of a silicon-on-insulator (SOI) substrate. With reference to FIG. 1A, the silicon waveguide-based device 100 delivers a power input $P_{IN}$ from a coupled, external light source to the suspended waveguide 110.

The use of on-chip waveguides on SOI allows for easy integration with standard v-groove couplers, enabling robust, precise alignment into and out of the device, regardless of device orientation, i.e., vertical or horizontal orientation.

Where the single-mode waveguide approaches the end of the SOI chip, a photonic crystal is defined on the section of waveguide that is freestanding over the edge of the SOI (FIG. 1B). This photonic crystal has two identified regions: a cavity region 113 that is located in closest proximity to the location of the probe tip 115, and bordering the cavity region on either side, a pair of mirror regions 111, 112. The nature of the overhanging photonic crystal allows for unrestricted mechanical movement of the optical cavity, both for driving mechanical motion of the probe tip (similar to the well-known tapping mode applied in the operation of AFMs), as well as for deflection caused by interaction with a sample.

Both the standard silicon waveguide and the photonic cavity are defined by lithography and etched using a plasma process. The suspended region serves as a cantilever (or a portion thereof), allowing for the freestanding region to attain high-Q optical resonance of the cavity and allowing for optomechanical motion of the cantilever region.

At the apex of the suspended region, a sharp probe tip 115 suitable for AFM is lithographically defined and fabricated with plasma etching (FIG. 1B).

With this design, we can attain significant optical access, as well as a substantial overhanging of the probe tip. With little limitation to the length of the protruding waveguide and probe tip, this exemplary design can enable greater flexibility for use as an optical AFM for samples with significant topography surrounding regions of interest for study.

The design of the photonic crystal and optical cavity is flexible. The optical cavity can be lithographically tailored for any of various incoming wavelengths (FIG. 2A,2B). Slight perturbations in the geometry of the photonic crystal defect region (as determined, e.g., by $\Lambda_{nh}$, i.e. by the local center-to-center distance between a given hole (of sequential number $n_h+1$) and the previous hole (of sequential number $n_h$) can allow for fine tuning of the resonant frequency of the cavity (FIG. 2C).

Changes in the surface topography results in changes in force being applied to the probe tip. Such changes in force can cause slight deformations in $h_y$ and $h_x$ (FIG. 2B), resulting in measurable shifts of the resonant frequency of the cavity (FIG. 3B). This effectively converts mechanical deformations of the cavity to frequency shifts. The amount of deformation can be controlled by the stiffness, which in highly tunable by the geometry of the waveguide.

Any suitable geometry can be employed. In one non-limiting instance, the suspended waveguide includes a quasi-periodic pattern of $N_{Total}$ holes, with the center of the structure being a hole (so that $N_{Total}$ is odd). For some odd number $N_{Defect}$ of holes in a defect region, i.e. in a photonic cavity region, the spacing between the holes can be reduced quadratically around the center hole, such as is shown in FIG. 2A, 2C.

Additional details for designing and testing waveguides are described in Eichenfield Thesis, cited above.

In the example of FIG. 2A, the first mirror region has a constant hole period of $\Lambda_1$ and the second mirror region has a constant hole period of $\Lambda_2$. In some example embodiments, these respective hole periods are equal.

As mentioned above, the hole period in example photonic cavity regions varies parabolically (i.e., quadratically). Any of various other spatial variations of the hole period may also be useful in this regard, including for example linear and logarithmic variations.

In embodiments using a single-mode waveguide, the need to support a single mode can impose an upper limit on the waveguide dimensions. A lower limit on the waveguide dimensions is imposed as a practical consequence of the resolution achievable by the lithographic method being employed.

By tailoring the mechanical stiffness of the cantilever, the cantilever can be adapted for specific applications (such as applications for biology and for semiconductor characterization).

Because of the flexibility that is offered in tuning the optical cavity by design, numerous optical cavities and probe tips can be serially fabricated for a variety of wavelengths and even deployed in parallel multiwavelength arrays.

Example 2

Figure 4:
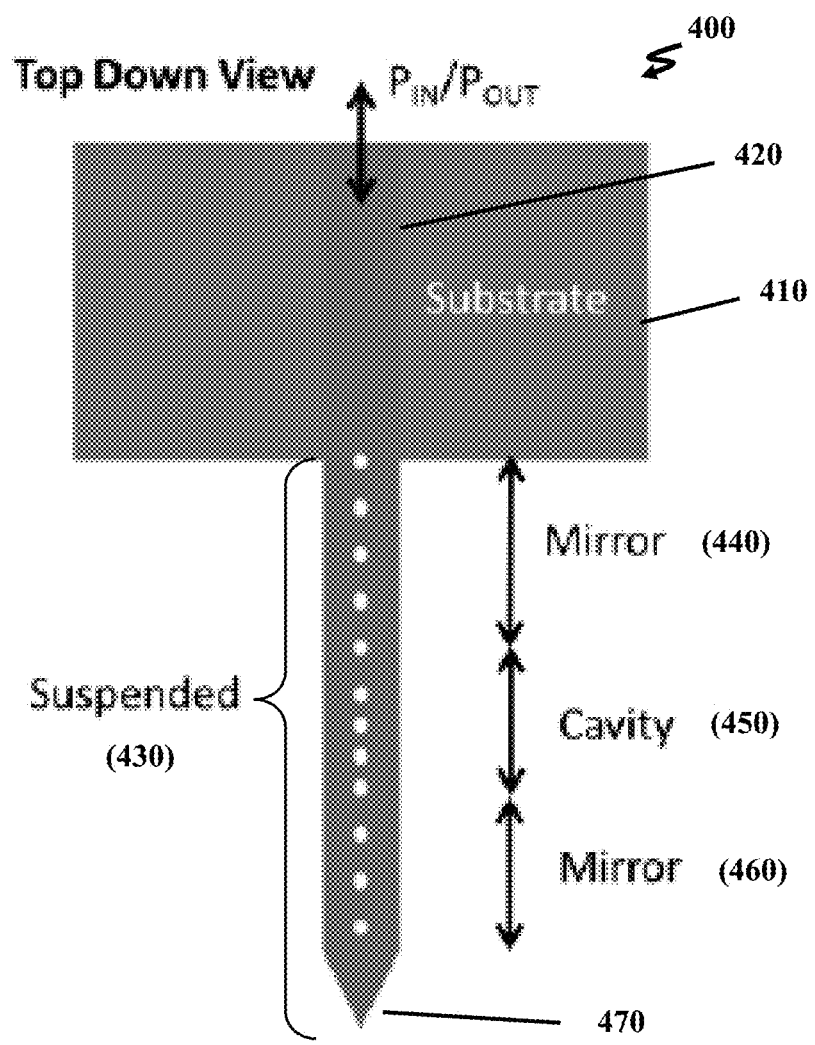
FIG. 4 is a notional drawing in plan view of an alternate embodiment of a cantilever structure, in which the suspended waveguide is conformed as a rectilinear cantilevered beam having a single anchor.

With reference to FIG. 4, an alternative design concept 400 places the optical cavity within a single rectilinear cantilevered beam instead of within a half-loop. This decreases the number of attachment points where the cantilevered beam is anchored to the substrate, and it invites the application of standard cantilevered beam fabrication techniques. As a consequence, the complexity of the design is reduced, simplifying both the fabrication and the integration of the optomechanical sensor device.

As seen in the figure, the cantilever structure includes substrate 410, input-output waveguide 420 formed on substrate 410, and suspended waveguide 430 conformed as a cantilevered beam, such as a rectangular beam, that extends rectilinearly from the substrate and has a single anchor. Waveguide 420 is a bidirectional waveguide having a single end for the injection of input light and the emission of output light.

Suspended waveguide 430 contains mirror region 440, optical cavity 450, and on the side of the optical cavity distal to the substrate, a second mirror region 460. The mirror-cavity-mirror structure is perforated with a pattern of holes to define a photonic crystal that supports a high-Q optical resonance. A probe tip 470 is defined at the distal end of the suspended waveguide.

Depending on the orientation of the optomechanical sensor device, the beam may be deflected either vertically or horizontally. In either case, beam deflection dimensionally alters the photonic crystal and thereby shifts the frequency of the resonance, allowing for high-resolution detection as described above.

We claim:

1. An optomechanical force sensor, comprising a substrate, a cantilevered beam anchored to the substrate, and a probe tip positioned near an end of the cantilevered beam distal to the substrate, wherein:
   an input/output waveguiding structure comprising at least one optical waveguide is disposed on the substrate;
   a suspended waveguide is disposed on the cantilevered beam and is optically continuous with the input/output waveguiding structure;
   an optical cavity is defined within the suspended waveguide;
   the suspended waveguide is a loop-shaped waveguide anchored at two points, and the input/output waveguiding structure consists of an input waveguide that joins the suspended waveguide at one of the anchor points and an output waveguide that joins the suspended waveguide at the other of the anchor points.

2. The optomechanical force sensor of claim 1, wherein: two mirror regions are defined in the suspended waveguide, and the optical cavity is defined between the two mirror regions.

3. An optomechanical force-sensing system, comprising:
   at least one optomechanical force sensor as recited in claim 1;
   an optical source configured to provide an optical input signal to the input/output wasveguiding structure of the at least one optomechanical force sensor; and
   a photodetector configured to receive an optical output signal from the input/output wasveguiding structure of the at least one optomechanical force sensor.

4. The optomechanical force-sensing system of claim 3, wherein:
   the at least one optomechanical force sensor comprises a plurality of the optomechanical force sensors; and
   the optical source is a multiwavelength source configured to concurrently provide respective optical input signals at different respective wavelengths to the optomechanical force sensors.

5. An optomechanical force sensor, comprising a substrate, a cantilevered beam anchored to the substrate, and a probe tip positioned near an end of the cantilevered beam distal to the substrate, wherein:
   an input/output waveguiding structure comprising at least one optical waveguide is disposed on the substrate;
   a suspended waveguide is disposed on the cantilevered beam and is optically continuous with the input/output waveguiding structure;
   an optical cavity is defined within the suspended waveguide;
   the suspended waveguide is perforated by an array of holes that defines a quasiperiodic photonic crystal.

6. The optomechanical force sensor of claim 5, wherein: the array of holes has a constant period in a first mirror region and in a second mirror region, an optical cavity region is defined between the first and second mirror regions, and the array of holes has a period that is spatially varying within the optical cavity region.

7. An optomechanical force-sensing system, comprising:
   at least one optomechanical force sensor;
   an optical source configured to provide an optical input signal to the input/output wasveguiding structure of the at least one optomechanical force sensor; and
   a photodetector configured to receive an optical output signal from the input/output wasveguiding structure of the at least one optomechanical force sensor, wherein:
   the at least one optomechanical force sensor comprises a substrate, a cantilevered beam anchored to the substrate, and a probe tip positioned near an end of the cantilevered beam distal to the substrate;
   an input/output waveguiding structure comprising at least one optical waveguide is disposed on the substrate;
   a suspended waveguide is disposed on the cantilevered beam and is optically continuous with the input/output waveguiding structure;
   an optical cavity having a resonant optical frequency is defined within the suspended waveguide of the at least one optomechanical force sensor; and
   the optical source is a scannable optical source configured to scan the optical input signal through a range of optical frequencies that includes the resonant optical frequency.

* * * * *